Oct. 28, 1924.
C. L. COOK
1,513,315
SELF BALANCING PIPE EXPANSION JOINT
Filed Oct. 20, 1920
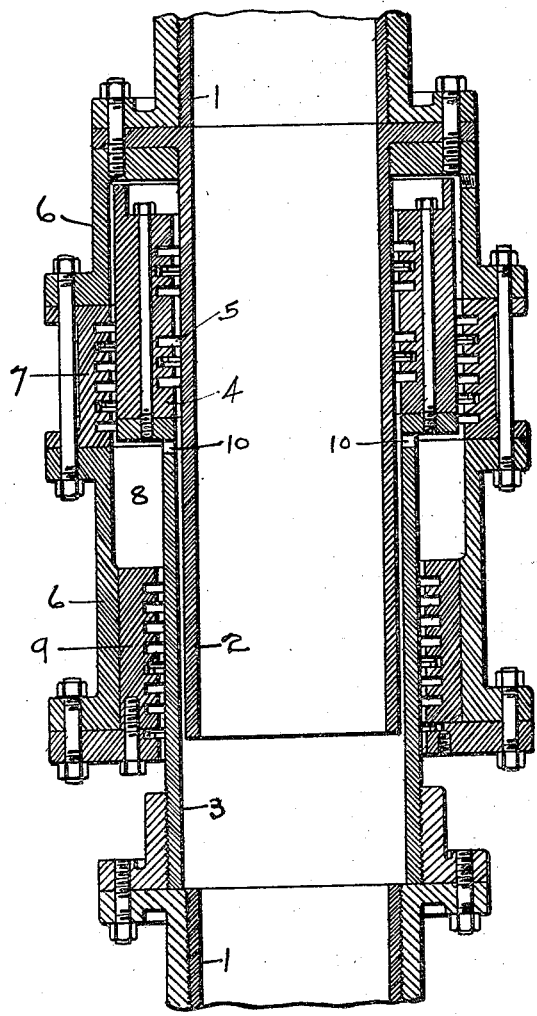
Charles Lee Cook INVENTOR.
BY
Bradford Webster ATTORNEY.

Patented Oct. 28, 1924.

1,513,315

UNITED STATES PATENT OFFICE.

CHARLES LEE COOK, OF LOUISVILLE, KENTUCKY.

SELF-BALANCING PIPE EXPANSION JOINT.

Application filed October 20, 1920. Serial No. 418,294.

*To all whom it may concern:*

Be it known that I, CHARLES LEE COOK, a citizen of the United States, residing at Louisville, Jefferson County, Kentucky, have invented a new and Improved Self-Balancing Pipe Expansion Joint, of which the following is a specification.

My invention relates particularly to joints in high pressure steam pipes of considerable length. It has for its objects to improve the efficiency and stability of such joints.

In the drawings, a part hereof, the figure is a vertical longitudinal section of an embodiment of my invention.

To the two ends of the pipe 1 to be connected, I fasten respectively the two telescoping extensions 2 and 3, inner and outer. The inner diameter of extension 3 is substantially larger than the outer diameter of extension 2, to take care of considerable non-alignment of the axes of the joined ends of the pipe 1. This is made practicable to quite a considerable extent by the external metallic packing mechanisms which I employ.

To the outer telescoping extension 3, I fix the preferably annular packing casing 4 positioning the packing rings 5, whereby the connection between the extensions 2 and 3 is packed. The rings 5 bear on the outer surface of the extension 2.

Outside the extension 3 and the packing ring 4, I place the annular sleeve 6, fixed positively to the extension 2. In this I set the packing mechanism 7 on one end of the equalizing pressure chamber 8 and the packing mechanism 9 on the other end of the pressure chamber 8, the packing mechanism 7 being an external packing bearing on the external surface of the packing casing 4 and the packing mechanism 9 bearing on the outer surface of the extension 3. The pressure equalizing chamber 8, between the extension 3 and the extended outer portion 6 of the extension 2, is connected with the inside of the pipe by a plurality of holes 10 through the extension 3. If one of the holes 10 is closed by proximity of the extensions 2 and 3, the other one must necessarily be freely connected with the internal chamber.

Thus I have provided for variation in alignment, for equalizing of pressure in all parts of the connection, and for thoroughly effective packing at all points.

I claim:

1. An expansible pipe joint comprising two telescopic members, one secured to each pipe section, the outer diameter of the inner member being less than the inner diameter of the outer member throughout their entire length, a cylindrical casing attached to one end of the inner member which incloses said outer member and is provided with an enlarged free end, the outer member also being provided with an enlarged free end, packing between said latter enlarged free end and both the inner member and the casing, and packing between the outer free end of the casing and the outer member.

2. An expansible pipe joint comprising two telescopic members, one secured to each pipe section, the outer diameter of the inner member being less than the inner diameter of the outer member throughout their entire length, a cylindrical casing attached to one end of the inner member which incloses said outer member and is provided with an enlarged free end, the outer member also being provided with an enlarged free end, packing between said latter enlarged free end and both the inner member and the casing, packing between the outer free end of the casing and the outer member, said enlarged free ends forming the ends of an annular pressure equalizing chamber.

3. An expansible pipe joint comprising a double-walled cylindrical shell attached to one pipe section, a cylindrical member attached to the other pipe section, and fitting within the walls of said shell, a packing casing attached to the free end of said member, a packing casing attached to the free end of the outer shell member, the two packing casings forming the ends of a pressure equalizing chamber.

4. An expansible pipe joint comprising a double-walled cylindrical shell attached to one pipe section, a cylindrical member attached to the other pipe section and fitting within the walls of said shell, a packing casing attached to the free end of said member, packing between this casing and both walls of the shell, a packing casing attached to the free end of the outer shell member and packing between this casing and the cylindrical member, the two packing casings forming the ends of a pressure equalizing chamber.

5. An expansible pipe joint comprising a double-walled cylindrical shell attached to one pipe section, a cylindrical member attached to the other pipe section and fitting within the walls of said shell, a packing casing attached to the free end of said member, packing between this casing and both walls of the shell, a packing casing attached to the free end of the outer shell member, and packing between this casing and the cylindrical member, the two packing casings forming the ends of a pressure equalizing chamber which has communication with the interior of the pipe.

CHARLES LEE COOK.

Witnesses:
WILLIAM C. CROSS,
ROBT. C. BALDWIN.